United States Patent
Foster et al.

(10) Patent No.: US 7,308,856 B2
(45) Date of Patent: Dec. 18, 2007

(54) SLEEVE BEARING FOR RAILWAY TRACTION MOTOR

(75) Inventors: Robert B. Foster, Erie, PA (US); Paul Bien, Downers Grove, IL (US); John E. Macklin, Fremont, NE (US)

(73) Assignee: Magnus Div. of LV Ventures, Inc., Fremont, NE (US)

( * ) Notice: Subject to any disclaimer, the term of this patent is extended or adjusted under 35 U.S.C. 154(b) by 318 days.

(21) Appl. No.: 11/178,937

(22) Filed: Jul. 11, 2005

(65) Prior Publication Data

US 2006/0013518 A1    Jan. 19, 2006

(51) Int. Cl.
*B61F 5/26* (2006.01)
*F16C 17/00* (2006.01)

(52) U.S. Cl. .................. 105/218.1; 384/7

(58) Field of Classification Search .......... 105/218.1, 105/218.2; 384/7, 13, 91, 93
See application file for complete search history.

(56) References Cited

U.S. PATENT DOCUMENTS

| | | |
|---|---|---|
| 2,980,472 A | 4/1961 | Harkenrider |
| 3,827,769 A | 8/1974 | Boller et al. |
| 3,905,659 A | 9/1975 | Renk et al. |
| 3,940,189 A | 2/1976 | Renk et al. |
| 3,941,438 A | 3/1976 | Charlton |
| 4,229,056 A * | 10/1980 | Renk ........................ 384/380 |
| 4,892,000 A | 1/1990 | Renk et al. |
| 5,038,631 A | 8/1991 | Renk et al. |
| 5,082,089 A | 1/1992 | Renk et al. |
| 5,129,156 A | 7/1992 | Walker |
| 5,996,542 A | 12/1999 | Bathurts |
| 6,460,656 B1 | 10/2002 | Jones, Jr. et al. |

* cited by examiner

*Primary Examiner*—S. Joseph Morand
*Assistant Examiner*—Robert J. McCarry, Jr.
(74) *Attorney, Agent, or Firm*—Much Shelist Freed; Milton S. Gerstein

(57) ABSTRACT

An improved sleeve bearing for locomotive traction motor that provides additional lubrication over and above that of the one central wick currently used. The sleeve bearing is provided with a recirculation system comprised of either at least two additional wicks located near the 6:00 operating location or multiple oil communication and delivery grooves passageways communicating with the oil flinger grooves placed for the purpose of collecting and providing a mechanism for providing additional lubrication for extending the oil-wetted envelope available for supporting the truck-axle journal in the axial direction.

16 Claims, 7 Drawing Sheets

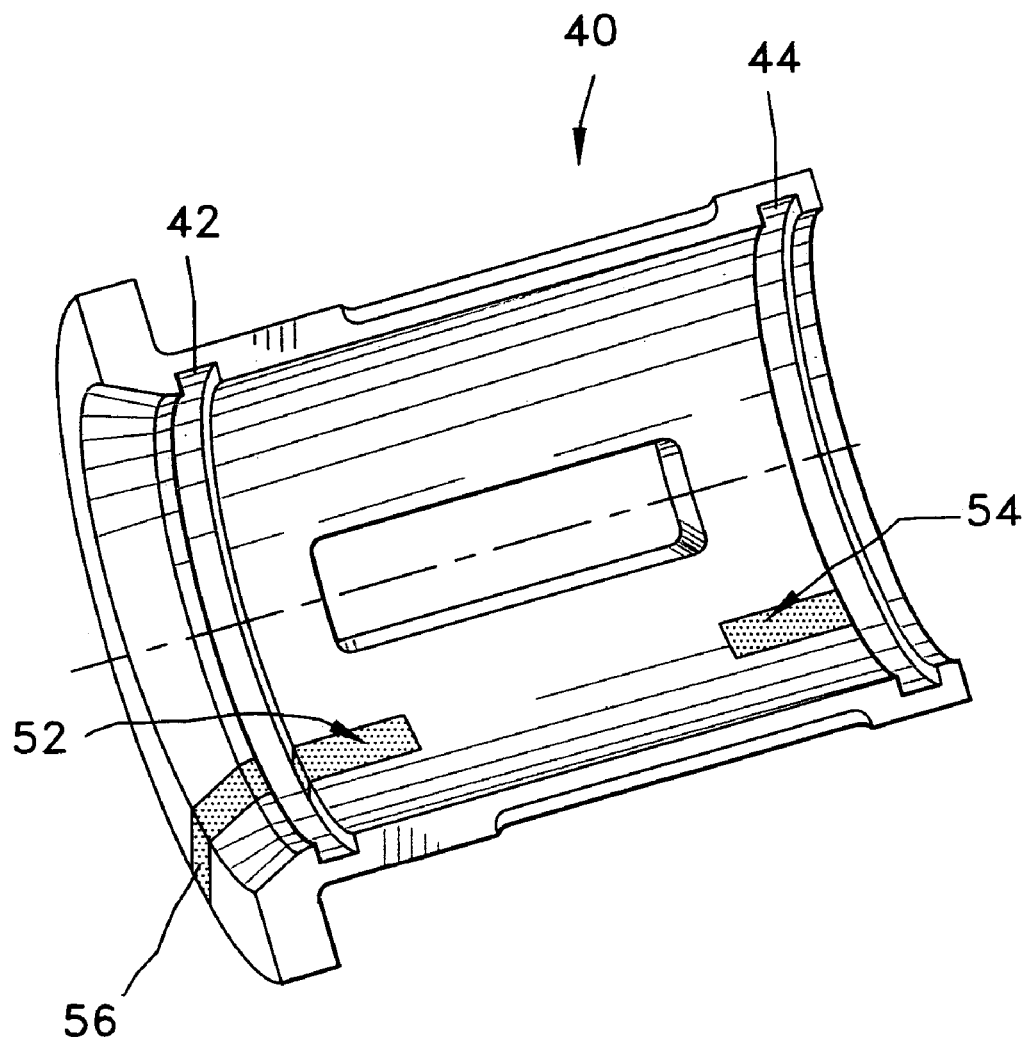

SLEEVE BEARING FOR RAILWAY TRACTION MOTOR

BACKGROUND OF THE INVENTION

The present invention is directed to a railway locomotive traction motor and, in particular, to the friction support or sleeve bearing by which the traction motor is partially supported on the axle of the railway truck mounting the underside of the locomotive, and, in particular, the invention is directed to providing additional lubrication.

A conventional railway locomotive pinion-end (PE) traction-motor support bearing, such as that disclosed in U.S. Pat. No. 5,038,631, is shown in FIGS. 1 and 4, which FIGS. 1 and 4 show the half of the support bearing 10 that contains the window 12 for passing a lubricating wick. For best overall performance and life of the traction-motor support bearing, the load zones for loading the truck axle should be centered. This is so in order that the lubricating wick (not shown) entering the interior of the bearing via the wick window or opening 12 lubricates all contacting surface-areas, which lubricating wick contacts the axle journal through the window. In addition, both load zones should be contained within the total axial dimension of the wick if possible, again in order to ensure the best possible lubrication. Each traction-motor sleeve bearing has two load zones, an upper one and a lower one, and these tend to be heaviest around 25° from vertical because of commonly-used 25° gear-tooth pressure angle. Both load-contact patterns can be seen in the window half 10 of the PE bearing with the upper load pattern above the lubricator access-window and the lower load pattern below the window. Ideally, both upper and lower load contact-patterns should be centered at mid-length of the window, in order that the wick lubricator provides the best possible lubrication. Further, both load contact-patterns should be contained within the total axial dimension or limits of the wick lubricator if possible, again to ensure the best possible lubrication.

The lubricating wick of the conventional sleeve bearing shown in FIGS. 1 and 4 enters the bearing from the lubrication sump through a cast opening in the axle cap, which is aligned with the window or opening 12 in the bearing liner. This opening 12 is centered axially on the journal and the wick protrudes through this opening to contact the axle at a position approximately 20°-30° below a horizontal line passing through the axle gear and pinion center lines. The sleeve bearing 10 also has a flange wick 16 for lubricating the flange-end 20.

The axial length of the preferred journal-to-liner contact area is defined by the axial length of the wick. The bearing liners are machined in such a way as to relieve the liners so that axle-journal contact under normal loads remains in the wick-wetted axial area 14. In many traction motor support bearings, however, the envelope available for supporting the journal is significantly longer in the axial direction than the wick and the length of wetted area.

Pinion-end sleeve bearing load ratings are frequently limited by the axial length that can be reliably lubricated by the lubrication delivery system. If lubrication can be assured beyond the axial dispersion of conventional support bearings, that additional length may become useful for supporting the axle journal. By reducing the unit loading of the original journal and thereby increasing the load capacity, or by reducing the required viscosity, surface finish, and other parameters affecting wear rate the reliability, is improved.

SUMMARY OF THE INVENTION

It is a primary objective of the present invention to provide an improved sleeve bearing for a locomotive traction motor that provides additional lubricated areas in the axle bore over and above that of the conventional central wick currently used.

According to the present invention, the sleeve bearing is provided with the ability to provide additional lubrication to the lateral areas beyond the width of the main supply wick by the addition of additional wicks one on either axial side of the central wick or by incorporating passageways near the 6:00 location on either axial side capable of communicating with the oil accumulated in the oil flinger grooves and taking advantage of the oil-flinger rotating lift capability and lateral movement within the bearing lateral clearances for providing additional lubrication and for extending the envelope of the wetted area available for supporting the truck-axle journal in the axial direction.

BRIEF DESCRIPTION OF THE DRAWINGS

The invention will be more readily understood with reference to the accompanying drawings, wherein:

FIG. 3 is a longitudinal, vertical cross-section view of a second embodiment of a sleeve bearing employing the additional lubricating wicks, one on the inboard end and one on the outboard end of the sleeve bearing where the bearing employs flinger grooves;

DETAILED DESCRIPTION OF THE INVENTION

Figure 1:
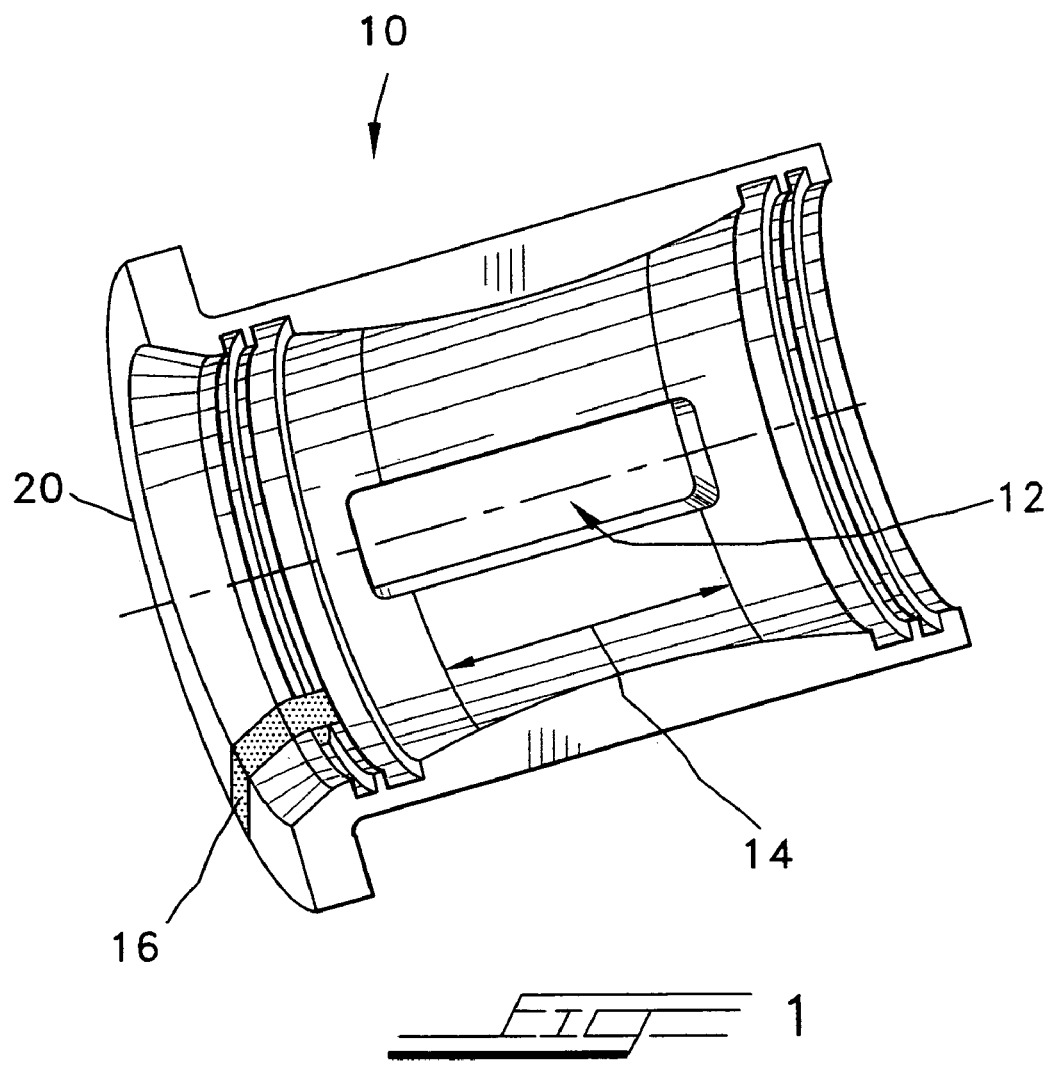
FIG. 1 is a longitudinal, vertical cross-section view of a window-half of a prior art sleeve bearing using one central lubricating wick.
Figure 2:
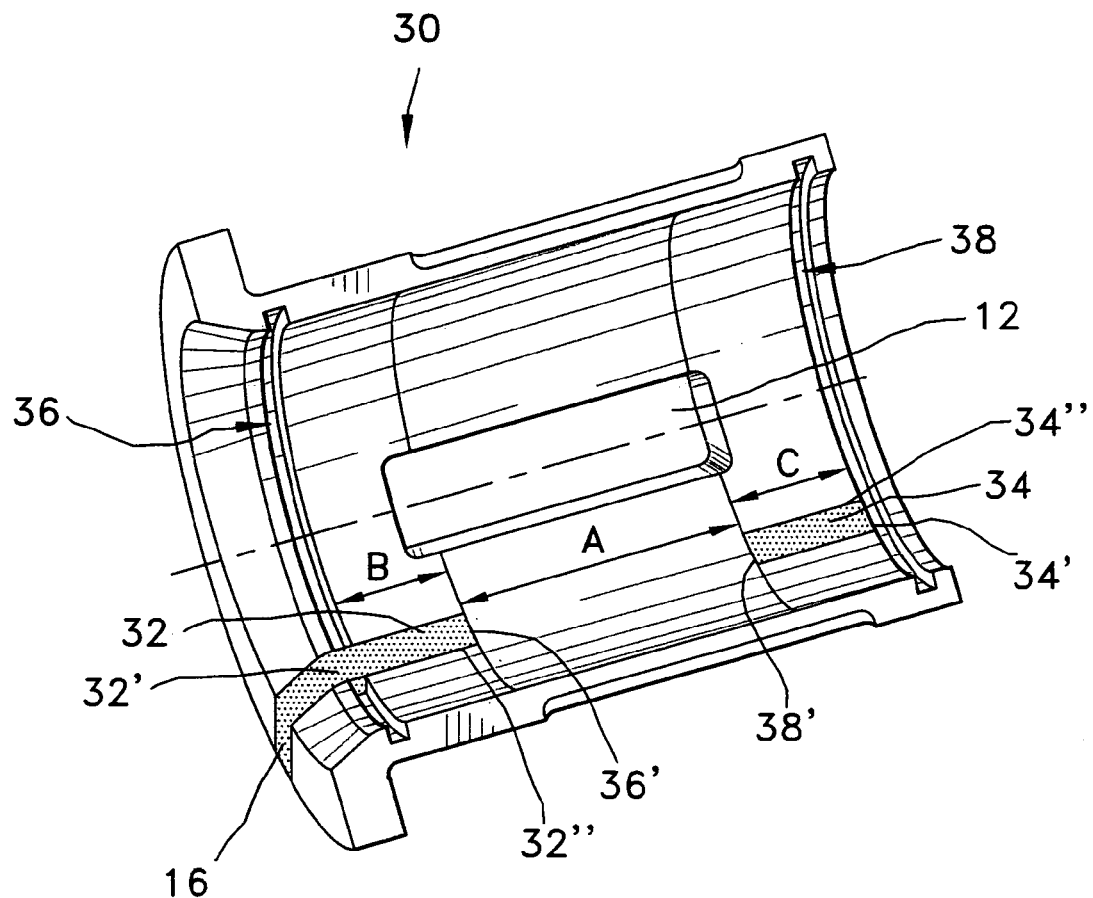
FIG. 2 is a longitudinal, vertical cross-section view of a first embodiment of the sleeve bearing of the invention employing the additional lubricating wicks of the invention, one on the inboard end and one on the outboard end of the sleeve bearing.
Figure 4:
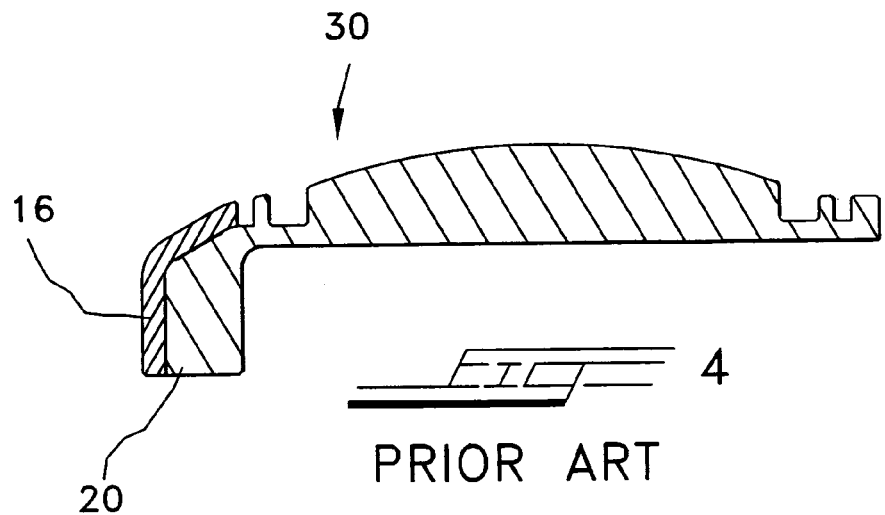
FIG. 4 is a partial longitudinal cross-section view showing a prior-art sleeve bearing having a flange wick at the flange-end, or outboard end, of the sleeve bearing.
Figure 5:
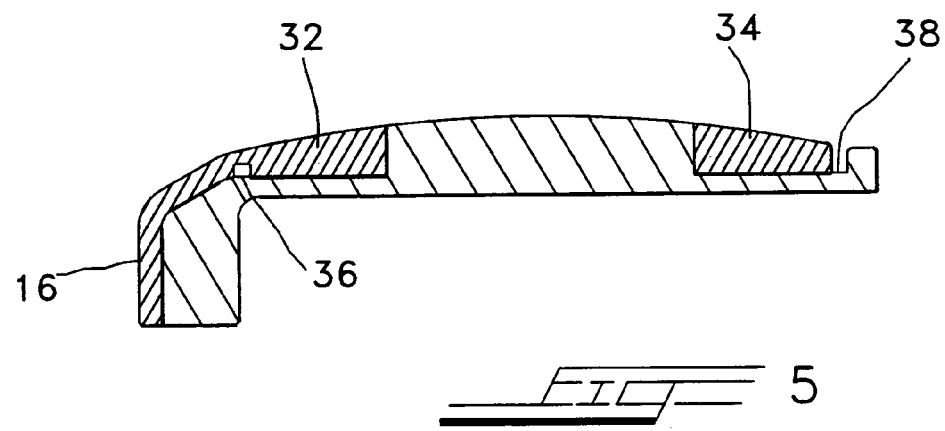
FIG. 5 is a partial longitudinal cross-section view similar to FIG. 4 but showing the sleeve bearing without flinger grooves with the additional wicks of the embodiment of FIG. 2.

Referring now to the drawings in greater detail, and to FIGS. 2 and 5 for now, there is shown a first embodiment of the railway-locomotive traction motor friction support or sleeve bearing of the invention and indicated generally by reference numeral 30. In this first embodiment, the invention is embodied in a friction support bearing that does not employ finger grooves. Flinger grooves mount finger rings which, when employed, help to redistribute the oil back to the oil reservoir and reduce oil loss, as disclosed in U.S. Patent No. 3,905,659. The sleeve bearing 30 is provided with a conventional central wick window 12, as explained herein above with regard to FIGS. 1 and 4, and, in addition, at least two supplemental or auxiliary wicks, one wick 32 at the outboard end and one wick 34 at the inboard end. The supplemental wicks 32, 34 are oriented at 6:00 O'clock when viewing FIG. 2. The outboard wick 32 is combined with the currently-used flange wick 16, also explained above with reference to the prior-art bearing of FIGS. 1 and 4. The wicks 32, 34 are lubricated via lateral flow oil collection grooves 36, 38, respectively, which are used, as in the conventional manner, for collecting oil, as explained in U.S. Patent No. 4,229,056. The provision of these additional wicks 32, 34 extend the effective length of the wetted area of the bearing to the areas encompassed by areas A, B and C in FIG. 2, to thus extend the lubricated surface from the hitherto prior-area area A, to thus make significantly longer in the axial direction the available wetted area for contact by the truck-axle journal. To ensure of the additional envelope length available, the simple reliable oil supply system 36, 38 is used. This system collects the lateral oil discharge from the loaded central region serviced by the conventional central wick and delivers the oil to those journal areas beyond the main wick wetted axial area via these additional wicks 34, 36. Thus, these oil collection grooves 36, 38 also serve the additional function of providing for this additional lubrication of the extended contact areas B and C.

The supplemental wick 32 is, in the preferred embodiment, narrower than the corresponding flange wick 16, although, if necessary, it may be the same or even greater in width. Each supplemental wick 32, 34 has a first overlapping portion 32', 34', respectively, that is received within the interior of a respective channel 36, 38, and a main longitudinal portion or section 32", 34" extending longitudinally axially in a direction toward the center of the friction bearing. With each overlapping portion 32', 34' positioned in the interior of the respective groove, each groove 36, 38 acts as a sump or reservoir for the additional wicks 32, 34. Furthermore, the main body portion 32", 34" of each wick 32, 34 is received or mounted in a recess or pocket formed in the interior shell of the friction bearing, in a manner similar to that shown in FIG. 8 as described hereinbelow. Each pocket has a depth less than that of the thickness of the respective additional wick 32, 34, so that each wick 32, 34 projects or protrudes out from the respective pocket, and interiorly toward the axle journal mounted in the bearing, for contact against the juxtapositioned surfaces of the journal located within the lateral extent of the above-mentioned contact areas B and C.

Each additional wick 32, 34 is made of conventional material providing capillary effect, such as that of which the conventional central wick is made or that of which the flange wick is made. As explained above, the width of each additional wick is preferably less than the width of the flange wick, although such does not preclude the same or greater width. The wicks may be made of felt or composite materials to optimize retention and delivery. The supplemental wicks may be retained by adhesives or by geometry of the machined pockets which also act as reservoirs in combination with the wick geometry.

Figure 6:
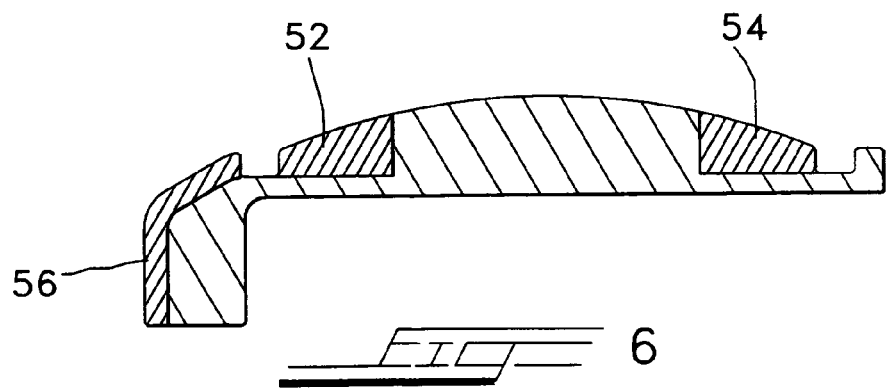
FIG. 6 is a partial longitudinal cross-section view similar to FIG. 5 but the showing the sleeve bearing utilizing flinger grooves with the additional wicks of the embodiment of FIG. 3.

Referring now FIGS. 3 and 6, there is shown a second embodiment of the sleeve bearing of the invention, which is directed to applying the invention to a friction bearing provided with flinger grooves, but without the oil collection grooves 36, 38 of the first embodiment of FIGS. 2 and 5. The friction support bearing of this embodiment is indicated generally by reference numeral 40, and, as shown, utilizes conventional flinger grooves 42, 44. In this embodiment, the flinger grooves 42, 44, in addition to serving their conventional function of mounting the flinger rings, as disclosed in U.S. Pat. No. 3,905,659, also serve the function of the lateral-flow oil-collection grooves for the additional wicks 52, 54. The additional wicks 52, 54 are oriented at 6:00 O'clock when viewing FIG. 3, as in the first embodiment. Since the flinger grooves 42, 44 mount the flinger rings, a separate conventional flange wick 56 is conventionally mounted. In all other respects, the additional wicks 52, 54 are the same as the wicks 32, 34 of the first embodiment, and are mounted in pockets or recesses similar to those shown in FIG. 8 discussed below.

Figure 7:
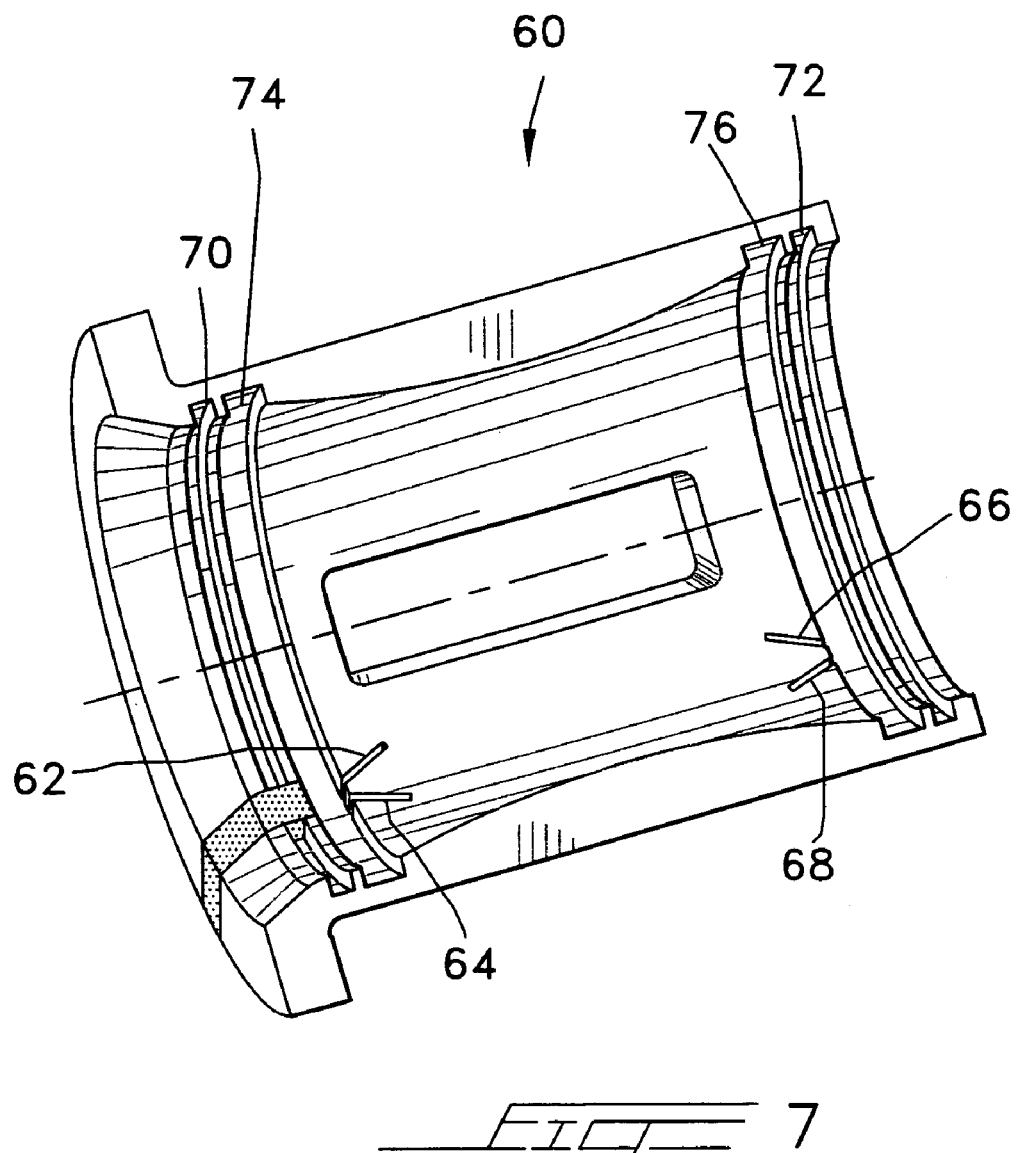
FIG. 7 is a partial longitudinal cross-section view similar to FIG. 3 and showing a third embodiment of the invention where the sleeve bearing, instead of having the additional wicks of the first and second embodiments, is provided with oil recirculation passageways originating near the 6:00 position, which passageways deliver oil from the flinger/collection grooves and redistribute a portion of the oil to the lateral areas of the bearing liner beyond the wick window.

Referring to FIG. 7, there is shown a third embodiment 60 of the invention in which, instead of using the additional wicks of the first two embodiments to lubricate the additional surface contact areas B and C, oil-flow passageways 62, 64 forming a V-shape are provided on the flange or outboard end, and oil-flow passageways 66, 68 forming a V-shape are provided on the inboard end. These passageways are oriented approximately at 6:00 O'clock when viewing FIG. 7. Unlike the first two embodiments, the friction bearing 60 is provided with both oil-collection grooves 70, 72 and finger grooves 74, 76, in a manner disclosed in U.S. Pat. No. 4,229,056. Each passageway opens into the interior of a respective finger grooves 74, 76 for fluid communication therewith, and, thus, effectively serve as oil-flow extension grooves of the finger grooves. The V-shaped passageways 62, 64, and the V-shaped passageways 66, 68 form an acute angle therebetween, as seen in FIG. 7, and preferably is in the range of between 15 degrees to 45 degrees, although this is not meant to be limiting. This embodiment takes advantage of the proven collection and return system of the conventional inboard and outboard ends of the bearing liner by using the finger rings to cause oil to flow into the oil recirculation grooves and hence to be delivered to the bearing lateral areas both at the inboard and outboard ends of the bearing liner beyond that wetted by the main delivery wick. While two such passageways have been shown which are V-shaped, more than two such passageways may be employed without a V-shaped configuration.

Figure 8:
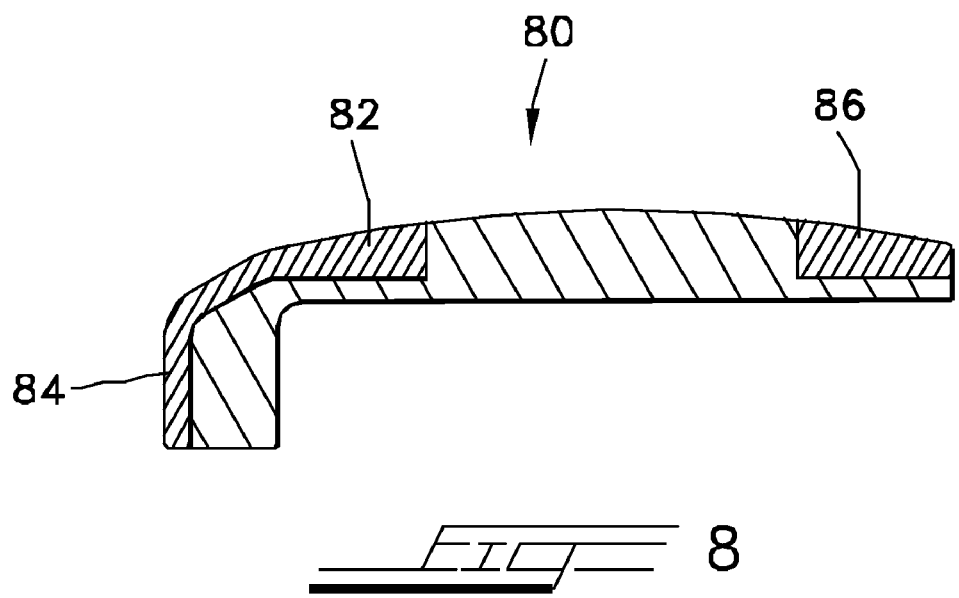
FIG. 8 is a partial longitudinal cross-section view similar to FIG. 5 of a fourth embodiment of the invention of a sleeve bearing without flinger rings or oil-collection grooves, with the outboard supplemental wick of the invention being connected to the flange wick.

Referring to FIG. 8, there is show a fourth embodiment 80 of the invention in which no flinger grooves or oil collection grooves are included in the friction bearing 80. In this case, the outboard supplemental wick 82 is connected to the flange wick 84 to form one continuous wick. The inboard supplemental wick 86 is the same as in the first two embodiments. Since the wicks are located at the 6:00 operating position, they would, therefore, receive their lubrication as a result of the natural gravity drainage accumulation from the journal wetted surfaces any time the axle would be at rest. During rotation, the normal supply wick delivers a band of oil on the axle. The supplemental or auxiliary wicks inboard ends would overlap this wetted band and take a portion of this oil to extend the wetted band width.

Figure 9:
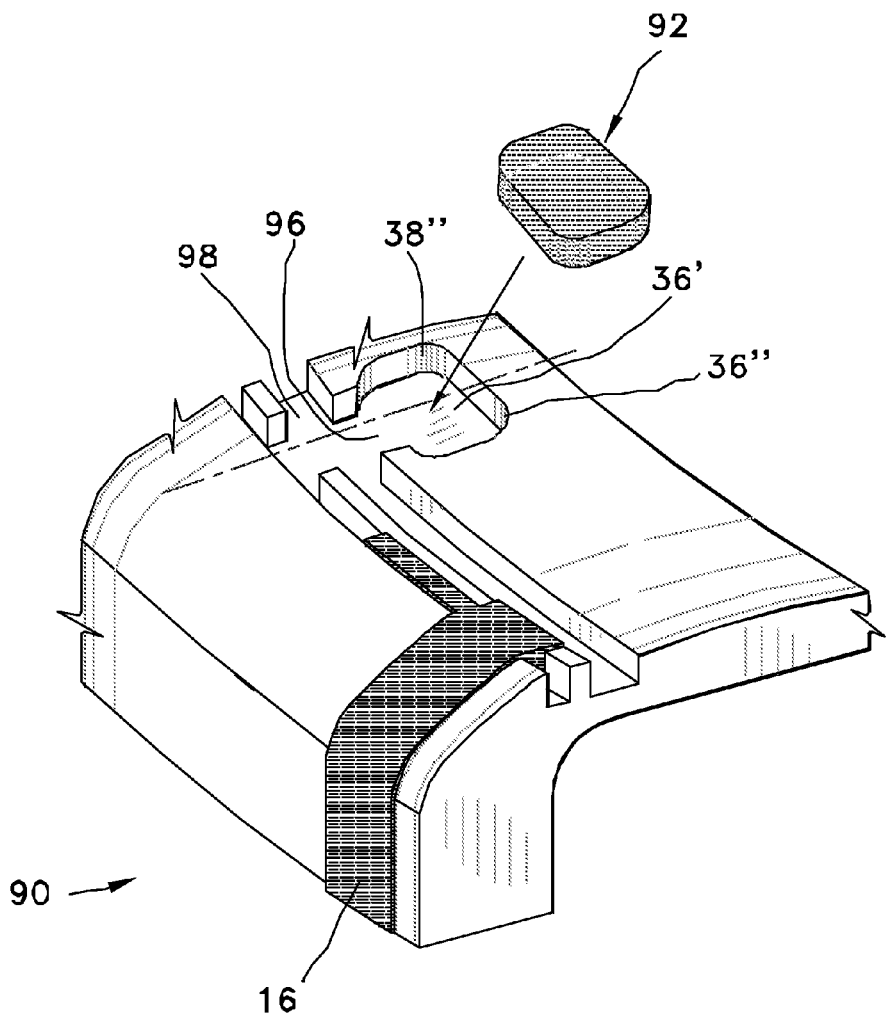
FIG. 9 is an isometric view showing a fifth embodiment of the invention utilizing both oil-collections grooves and flinger grooves at the inboard and outboard ends, and shows a pocket or recess for mounting therein an supplemental or auxiliary wick.

Referring to FIG. 9, there is shown a fifth embodiment 90 which incorporates both finger grooves and oil-collection grooves. The supplemental or auxiliary wicks 92 are received in pockets or recesses 36' formed in the interior shell of the friction bearing. Each pocket has a depth less than that of the thickness of the respective additional wick, so that each wick projects or protrudes out from the respective pocket, and interiorly toward the axle journal mounted in the bearing, for contact against the juxtapositioned surfaces of the journal located within the lateral extent of the above-mentioned contact areas B and C. Each pocket 36' has an open end 96 that is in fluid communication with the interior of a respective finger groove 98 for lubricating the respective supplemental or auxiliary wick in a manner similar to the embodiment of FIG. 3. It is also noted that corners 36", 38" of the pockets are rounded to ensure that the wicks are maintained therein.

Use of the supplemental or auxiliary wicks of the present invention allows reduced-width finger grooves as compared to the prior art friction support bearings, and also allows for the fingers grooves to be moved farther away from the center wick. Also, it is possible to have a version of the invention where the finger grooves and the outboard oil-collection groove are eliminated, which would extend the usable load-carrying width approximately one more inch.

In one prototype of the friction support bearing of the invention for use with a General Electric 752 AG traction motor, the width of the crowned load-bearing surface area was increased to approximately 5.18 in. as compared to 3.76 in. for the conventional bearing. Also, each supplemental or auxiliary wick was approximately 1.25 in. in length taken in the direction parallel to the annular finger groove, and 0.81 in. in width taken in the axial bearing direction, with the thickness thereof depending upon proper contact with the axle journal juxtapositioned thereat, and was received in a pocket or recess of width of 0.81 inch and length of 1.25 inches, with the pocket having rounded corners of radius 0.312 in. similar to the rounded corners of the supplemental or auxiliary wick. In addition, the open end 96 was 0.626 in.

While specific embodiments of the invention have been shown and described, it is to be understood that numerous changes and modifications may be made therein without departing from the scope and spirit of the invention

What is claimed is:

1. In a friction support bearing for a railway locomotive traction motor comprising an main bearing housing having an inboard end portion and an outboard end portion, a central wick window for a central lubricating wick, an interior surface at least part of which contacts an axle journal, a mounting flange at said outboard end portion, and a lubricating flange wick operatively associated with said mounting flange; said outboard end of said interior surface having at least one of a flinger groove and an oil collection groove, and said inboard end of said interior surface also having at least one of a flinger groove and an oil collection groove, the improvement comprising:
    a first outboard supplemental lubricating wick at said outboard end portion, and a second inboard supplemental wick at said inboard end portion, for additionally lubricating the contact surface area between said interior surface and said axle journal axially beyond the limits of said central lubricating wick;
    each of said first and second supplemental lubricating wicks being located approximately at the 6:00 position of said main bearing housing;
    each of said first and second supplemental wicks extending axially interiorly from its respective said at least one groove, said first outboard supplemental wick extending from the opposite side of said at least one outboard groove as said flange wick, whereby said grooves provide a lubricating source for said supplemental wicks.

2. The friction support bearing for a railway locomotive traction motor according to claim 1, wherein said interior surface further comprises an inboard-end mounting pocket for mounting said inboard-end supplemental wick, and an outboard-end mounting pocket for mounting said outboard-end supplemental wick, each said pocket extending axially inwardly away from a respective said at least one groove; each of said mounting pockets having a depth less than the thickness of the respective said supplemental wick, so that each said supplemental wick contacts against a juxtapositioned portion of an axle journal located thereat.

3. The friction support bearing for a railway locomotive traction motor according to claim 2, wherein each said mounting pocket comprises an opening that opens into a respective said at least one groove for allowing the respective said supplemental wick to be in fluid communication with the interior of the respective said groove.

4. A method of extending the lubricated contact surface area of a friction support bearing for a railway locomotive traction motor and an axle journal mounted therein, said friction support bearing comprising a main bearing housing having an inboard end portion and an outboard end portion, a central wick window for a central lubricating wick, and an interior liner defining a central interior portion thereof that contacts an axle journal for support thereby, said method comprising:
    (a) supplementally lubricating the interior outboard surface of said interior liner for extending the surface contact-area between said interior liner and said axle journal beyond said central interior portion in an outboard direction;
    (b) supplementally lubricating the interior inboard surface of said interior liner for extending the surface contact-area between said interior liner and said axle journal beyond said central interior portion in an inboard direction;
    said step (a) comprising providing a supplemental outboard lubricator, and said step (b) comprises providing a supplemental inboard lubricator.

5. The method of extending the lubricated contact surface area of a friction support bearing for a railway locomotive traction motor and an axle journal mounted therein according to claim 4, wherein said friction support bearing further comprises at least one outboard groove and at least one inboard;
    said step (a) comprising lubricating said supplemental outboard lubricator via said at least one outboard groove;
    said step (b) comprising lubricating said supplemental inboard lubricator via said at least one inboard groove.

6. The method according to claim 4, wherein said step (a) comprising providing a supplemental outboard wick, and said step (b) comprises providing a supplemental inboard wick.

7. In a friction support bearing for a railway locomotive traction motor comprising a main bearing housing having an inboard end portion and an outboard end portion, a central wick window for a central lubricating wick, and an interior surface at least a part of which contacts an axle journal, the improvement comprising:

a first inboard supplemental wick at said inboard end portion for additionally lubricating the surface contact area between said interior surface and said axle journal axially beyond the limits of said central lubricating wick;

a second outboard supplemental wick at said outboard portion for additionally lubricating the surface contact area between said interior surface and said axle journal axially beyond the limits of said central lubricating wick;

each of said first and second supplemental wicks being located approximately at the 6:00 position of said main bearing housing.

8. The friction support bearing for a railway locomotive traction motor according to claim 7, wherein said friction support bearing comprises a mounting flange at said outboard end portion, and a lubricating flange wick, said main bearing housing further comprising an outboard-end flinger groove, and an inboard-end flinger groove; said second supplemental lubricating wick adjacent said outboard end portion being in approximate alignment with said flange wick and on the opposite side of said outboard-end flinger groove, whereby said outboard-end flinger groove provides a lubricating source for said outboard-end supplemental wick.

9. The friction support bearing for a railway locomotive traction motor according to claim 8, wherein said interior surface further comprises an inboard-end mounting pocket for mounting said first inboard-end supplemental wick, and an outboard-end mounting pocket for mounting said second outboard-end supplemental wick, each said pocket extending axially inwardly away from a respective said flinger groove; each of said mounting pockets having a depth less than the thickness of the respective said supplemental wick, so that each said supplemental wick contacts against a juxtapositioned portion of an axle journal located thereat.

10. The friction support bearing for a railway locomotive traction motor according to claim 9, wherein each said mounting pocket comprises an opening that opens into a respective said flinger groove for allowing the respective supplemental wick to be in fluid communication with the interior of the respective said flinger groove.

11. The friction support bearing for a railway locomotive traction motor according to claim 8, wherein said main bearing housing further comprises an outboard-end oil-collection groove adjacent to, and outboard of, said outboard-end flinger groove; and an inboard-end oil-collection groove adjacent to, and inboard of, said inboard-end flinger groove; said second supplemental lubricating wick at said outboard end portion being in approximate alignment with said flange wick extending away therefrom axially inwardly from the opposite side of said outboard oil-collection groove.

12. The friction support bearing for a railway locomotive traction motor according to claim 7, wherein said main bearing housing further comprises an outboard-end oil-collection groove, and an inboard-end oil-collection groove, said interior surface further comprising an inboard-end mounting pocket for mounting said first inboard-end supplemental wick, and an outboard-end mounting pocket for mounting said second outboard-end supplemental wick, each said pocket extending axially inwardly away from a respective said oil-collection groove; each of said mounting pockets having a depth less than the thickness of the respective said supplemental wick, so that each said supplemental wick contacts against a juxtapositioned portion of an axle journal located thereat.

13. The friction support bearing for a railway locomotive traction motor according to claim 12, wherein each said mounting pocket comprises an opening that opens into a respective said oil-collection groove for allowing the respective supplemental wick to be in fluid communication with the interior of the respective said oil-collection groove.

14. In a friction support bearing for a railway locomotive traction motor comprising a main bearing housing having an inboard end portion and an outboard end portion, a central wick window for a central lubricating wick, and an interior surface at least a part of which contacts an axle journal, the improvement comprising:

a first inboard supplemental lubricator at said inboard end portion for additionally lubricating the surface contact area between said interior surface and said axle journal axially beyond the limits of said central lubricating wick;

a second outboard supplemental lubricator at said outboard portion for additionally lubricating the surface contact area between said interior surface and said axle journal axially beyond the limits of said central lubricating wick;

each of said first and second supplemental wicks being located approximately at the 6:00 position of said main bearing housing.

15. The friction support bearing for a railway locomotive traction motor according to claim 14, wherein said first supplemental lubricators comprises first passageway means formed in said interior surface at said inboard end portion and said second supplemental lubricator comprises second passageway means formed in said interior surface at said outboard end portion.

16. The friction support bearing for a railway locomotive traction motor according to claim 15, wherein said main bearing housing further comprises at least one of an outboard-end flinger groove and an oil-collection groove, and at least one of an inboard-end flinger groove and an oil-collection groove; each of said first and second passageway means having an opening in fluid communication with a respective said at least one of a flinger groove and an oil collection groove and extending axially inwardly therefrom.

* * * * *

UNITED STATES PATENT AND TRADEMARK OFFICE
CERTIFICATE OF CORRECTION

PATENT NO. : 7,308,856 B2
APPLICATION NO. : 11/178937
DATED : December 18, 2007
INVENTOR(S) : Robert B. Foster et al.

It is certified that error appears in the above-identified patent and that said Letters Patent is hereby corrected as shown below:

Column 3:
  Line 10, "finger" (both occurrences) should read -- flinger --.

Column 4:
  Line 36, "finger" should read -- flinger --;
  Line 38, "finger" should read -- flinger --;
  Line 40, "finger" should read -- flinger --;
  Line 47, "finger" should read -- flinger --.

Column 5:
  Line 4, "finger" should read -- flinger --;
  Line 15, "finger" should read -- flinger --;
  Line 21, "finger" should read -- flinger --;
  Line 23, "finger" should read -- flinger --;
  Line 25, "finger" should read -- flinger --;
  Line 34, "finger" should read -- flinger --;
  Line 48, "an" should read -- a --;
  Line 54, "outboard end" should read -- outboard end portion --;
  Line 56, "inboard end" should read -- inboard end portion --.

Column 6:
  Line 5, "outboard=" should be deleted;
  Line 11, "inboard-end" should read -- inboard --;
  Lines 12-13, "outboard-end" should read -- outboard --;
  Line 52, "inboard" should read -- inboard groove --;
  Line 58, "comprising" should read -- comprises --.

Column 7:
  Line 3, "said axle" should read -- an axle --;
  Line 4, "said" should read -- a --;
  Line 7, "portion" should read -- end portion --;
  Line 8, "said axle" should read -- an axle --;
  Line 9, "said" should read -- a --;
  Line 20, "lubricating" should be deleted;
  Line 20, "adjacent" should read -- at --;
  Line 24, "outboard-end" should read -- outboard --;
  Line 29, "inboard-end" should read -- inboard --;
  Line 31, "outboard-end" should read -- outboard --;
  Line 52, "outboard" should read -- outboard-end --.

UNITED STATES PATENT AND TRADEMARK OFFICE
CERTIFICATE OF CORRECTION

PATENT NO. : 7,308,856 B2
APPLICATION NO. : 11/178937
DATED : December 18, 2007
INVENTOR(S) : Robert B. Foster et al.

It is certified that error appears in the above-identified patent and that said Letters Patent is hereby corrected as shown below:

Column 8:
  Line 4, "inboard-end" should read -- inboard --;
  Line 6, "outboard-end" should read -- outboard --;
  Line 27, "said axle" should read -- an axle --;
  Line 28, "said" should read -- a --;
  Line 31, "portion" should read -- end portion --;
  Line 32, "said axle" should read -- an axle --;
  Line 33, "said" should read -- a --;
  Line 40, "lubricators" should read -- lubricator --.

Signed and Sealed this

Twenty-fourth Day of June, 2008

JON W. DUDAS
*Director of the United States Patent and Trademark Office*